U. KAWASAKI.
EMBROIDERY FRAME HOLDER.
APPLICATION FILED MAY 8, 1915.
1,200,850.
Patented Oct. 10, 1916.
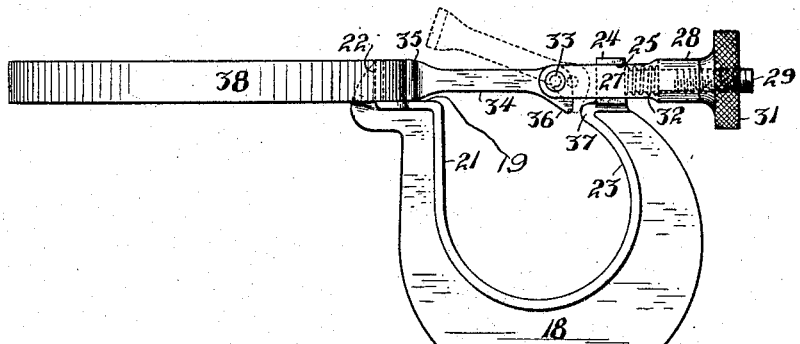
Fig. 1.
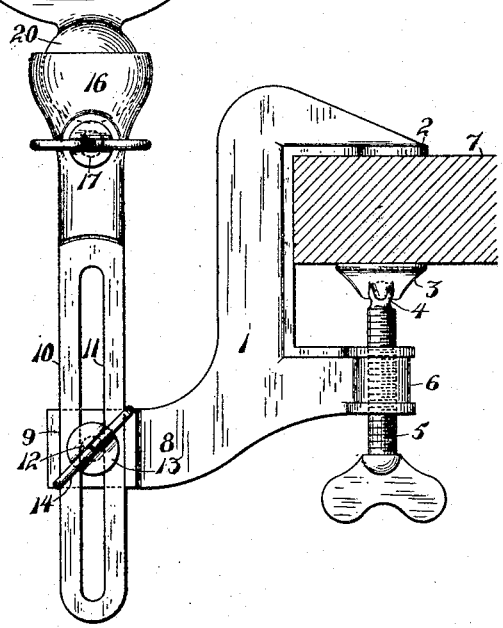
Fig. 2.
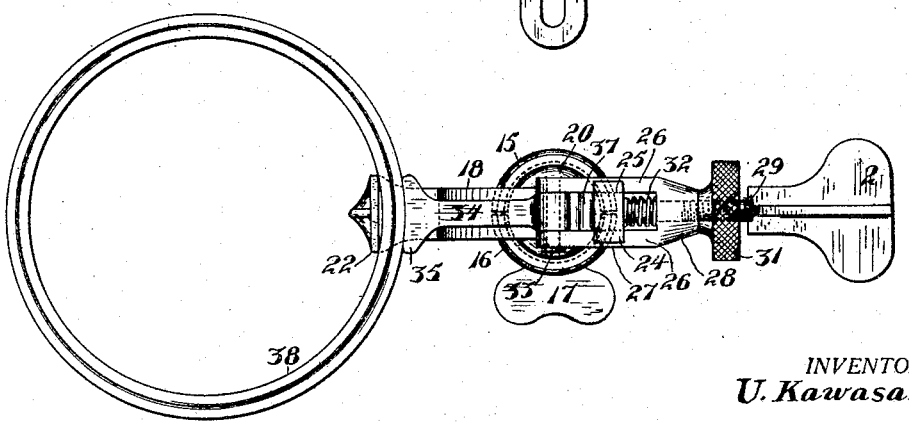
INVENTOR,
U. Kawasaki,
BY
Francis M. Wright
ATTORNEY

UNITED STATES PATENT OFFICE.

UTAKICHI KAWASAKI, OF SAN FRANCISCO, CALIFORNIA.

EMBROIDERY-FRAME HOLDER.

1,200,850.

Specification of Letters Patent.

Patented Oct. 10, 1916.

Application filed May 8, 1915. Serial No. 26,721.

*To all whom it may concern:*

Be it known that I, UTAKICHI KAWASAKI, a subject of the Emperor of Japan, residing at San Francisco, in the county of San Francisco and State of California, have invented new and useful Improvements in Embroidery-Frame Holders, of which the following is a specification.

The object of the present invention is to provide an embroidery frame holder which will be of simple construction and which will permit the position of the embroidery frame to be readily changed as desired, and the frame to be readily removed from the holder.

In the accompanying drawing, Figure 1 is a side view of the embroidery frame holder; Fig. 2 is a plan view of the same.

Referring to the drawing, 1 indicates a clamp having a stationary jaw 2, and a movable jaw 3, the latter being connected by a ball and socket joint 4 with the upper end of a screw 5 screwed through an arm 6 of the clamp. By means of this clamp the frame holder can be readily clamped to a table 7 or the like. 8 indicates a holding arm of said clamp having a grooved portion 9, in which can slide vertically a stem 10 having a vertical slot 11 through which extends a screw 12 screwed into said arm and having a flanged portion 13 adapted to engage the front side of said slotted arm, the front end of the screw being provided with a thumb piece 14. The upper end of the stem is enlarged to form a section 15 of a socket, the other section 16 being held to said socket by means of a screw 17 extending through said section 16 and into the section 15. By means of said screw the socket section 16 can be drawn to the socket section 15 and thereby clamped around a ball 20 formed on the lower portion of a U-shaped frame-holder 18. By unscrewing the screw, the section 16 can be loosened or removed from the section 15 and the socket can thus be enlarged, so that the ball can be turned therein to any desired position or can be removed therefrom, and by screwing in the screw, the socket can again be contracted so that the ball is held tightly in the position to which it has been turned.

One member 21 of the U-shaped holder 18 is formed with a ledge 19 and a jaw 22 at the end of said ledge, and the other member 23 terminates in a guide 24 the sides of which are grooved, as shown at 25, to form guideways. In said guideways can slide horizontally the two members 26 of a forked adjuster 27, the central portion 28 of which is formed with a central hole through which passes a stem 29 extending horizontally from the guide 24. The outer end of said stem is threaded, and a nut 31 is screwed thereon. A spring 32 is compressed between the guide and the inner side of the central portion of the forked member and presses said forked member outward when the nut 31 is unscrewed. Between the inner ends of the members 26 of the forked adjuster is pivoted by a pivot pin 33 an arm 34 having at its outer end a jaw 35 and having also extending therefrom obliquely a short arm 36 adapted to abut against a terminal portion 37 of the member 23 when the nut is withdrawn, said portion 27 forming an abutment. The jaws 35 and 22 are adapted to clamp between them the wooden embroidery frame 38 of usual construction.

The mode of operation of the device is extremely simple. The nut 31 is first unscrewed so as to withdraw the jaw 35 a sufficient distance from the jaw 22. In moving away from the jaw 22 the short arm 36 impinges upon the terminal portion 37, and, consequently, in the further movement of the adjuster, since the pivot 33 continues to move away from the jaw 22, the arm 34 is tilted, thus facilitating the insertion of the embroidery frame in its position against the jaw 22. When the frame has been so placed in position, the nut 31 is screwed up again, causing the arm 34 to first descend into a horizontal position and then the jaw 35 to clamp the frame against the jaw 22.

I claim:—

1. In combination, a U-shaped frame holder, of which one member has a ledge and a jaw at the end of said ledge, and the other member has a terminal guide having extending therefrom a stem, a fork-shaped member guided horizontally by said guide and having a hole through which said stem passes, means engaging said stem for pressing said fork-shaped member in the direction of said jaw, and an arm pivoted within the ends of the fork-shaped member and having at its outer end a jaw adapted to rest upon said ledge and to clamp an embroidery frame between it and the first-named jaw.

2. In combination, a U-shaped frame holder, of which one member has a ledge and a jaw at the end of said ledge, and the other member has a terminal abutment and a terminal guide having extending therefrom a stem, a fork-shaped member guided horizontally by said guide and having a hole through which said stem passes, means engaging said stem for pressing said fork-shaped member in the direction of said jaw, and an arm pivoted within the ends of the fork-shaped member and having at its outer end a jaw adapted to rest upon said ledge and to clamp an embroidery frame between it and the first-named jaw, said arm having a short arm extending therefrom and adapted to abut against said abutment.

3. In combination, a clamp, a stem, means for movably securing the stem to the clamp, a U-shaped frame holder, said stem and holder having, the one an expansible socket and the other a ball in said socket, means for expanding and contracting said socket, one member of the U-shaped holder having a ledge and a jaw at the end of said ledge, and the other member having a terminal guide, said terminal guide having extending therefrom a stem threaded at its outer end, a fork-shaped member guided horizontally by said guide and having a hole through which said stem passes, a nut screwed on said threaded end and abutting against the central portion of said fork-shaped member, a spring coiled around the stem and compressed between said central portion and the guide, an arm pivoted between the ends of said fork-shaped member and having at its outer end a jaw adapted to rest upon said ledge and to clamp an embroidery frame between it and the first-named jaw.

4. In combination, a clamp, a stem, means for movably securing the stem to the clamp, a U-shaped frame holder, said stem and holder having, the one an expansible socket and the other a ball in said socket, means for expanding and contracting said socket, one member of the U-shaped holder having a ledge and a jaw at the end of said ledge, and the other member having a terminal guide and a terminal abutment, said terminal guide having extending therefrom a stem threaded at its outer end, a fork-shaped member guided horizontally by said guide and having a hole through which said stem passes, a nut screwed on said threaded end and abutting against the central portion of said fork-shaped member, a spring coiled around the stem and compressed between said central portion and the guide, an arm pivoted between the ends of said fork-shaped member and having at its outer end a jaw adapted to rest upon said ledge and to clamp an embroidery frame between it and the first-named jaw, said arm having a short arm extending therefrom and adapted to abut against said abutment.

In testimony whereof I have hereunto set my hand in the presence of two subscribing witnesses.

U. KAWASAKI.

Witnesses:
F. M. WRIGHT,
D. B. RICHARDS.

Copies of this patent may be obtained for five cents each, by addressing the "Commissioner of Patents, Washington, D. C."